United States Patent [19]
Hasegawa

[11] Patent Number: 4,578,710
[45] Date of Patent: Mar. 25, 1986

[54] LENS SYSTEM FOR PROJECTION TELEVISION

[75] Inventor: Shinichi Hasegawa, Tokyo, Japan

[73] Assignee: Pioneer Electronic Corporation, Tokyo, Japan

[21] Appl. No.: 607,915

[22] Filed: May 7, 1984

[30] Foreign Application Priority Data

May 9, 1983 [JP] Japan ............................. 58-67846[U]

[51] Int. Cl.[4] ......................... H04N 5/74; H04N 9/31; G02B 17/00
[52] U.S. Cl. .................................... 358/231; 358/237; 358/60; 350/445; 350/446; 353/77; 353/78
[58] Field of Search .......................... 358/237, 60, 231; 353/77, 78; 350/445, 446, 123, 122; 352/6, 8, 9, 10, 104

[56] References Cited

U.S. PATENT DOCUMENTS 3,724,927  4/1973  Cox ...................................... 350/445

FOREIGN PATENT DOCUMENTS 1103961  4/1961  Fed. Rep. of Germany ...... 358/237

Primary Examiner—Michael A. Masinick
Assistant Examiner—E. Anne Toth
Attorney, Agent, or Firm—Sughrue, Mion, Zinn, Macpeak and Seas

[57] ABSTRACT

A projection television receiver having a more compact cabinet size due to an improved projection lens system. The projection lens system includes a plano-concave lens and a plano-convex lens having optical axes forming an angle in a range of 170° to 190°. First and second mirrors are positioned rearwardly of the plano-concave mirror and the plano-convex mirror to reflect light rays from the plano-concave mirror parallel to the optical axis of the plano-convex mirror. A convex lens is positioned between the two mirrors and the optical path between the plano-concave mirror and the plano-convex mirror.

6 Claims, 11 Drawing Figures

LENS SYSTEM FOR PROJECTION TELEVISION

BACKGROUND OF THE INVENTION

The present invention pertains to a projection television receiver having an improved lens system whereby the size of the television receiver can be reduced.

FIG. 1 depicts a conventional lens system A for use in a projection television receiver. In this system, three lenses 1, 2 and 3 are employed with a reflector 4 positioned between the lenses 2 and 3 so as to deflect the optical axis by substantially 90°. The lens system A of FIG. 1 is more compact than the lens system B of FIG. 2 which employs no such reflector 4.

FIGS. 3 and 4 show schematic cross-sectional views of projection television receivers employing a lens system of the type shown in FIG. 1. In the receiver of FIG. 3, the reflector 4 in the lens system A is inclined slightly with respect to the plane of the base of the cabinet 5. An image formed on the face of a projection-type cathode-ray tube 6 is enlarged by the lens system A, and then reflected by mirrors 7 and 8 onto a projection screen 9 at the front of the cabinet 5. In the projection television receiver shown in FIG. 4, the reflector 4 of the lens system A is oriented at an angle of about 45° with respect to the plane of the base of the cabinet 5. In this case, the longitudinal axis of the cathode-ray tube 6 can be made more nearly perpendicular to the plane of the base of the cabinet 5, thereby reducing the depth of the cabinet 5. In this case, a mirror 10 arranged adjacent the top of the cabinet 5 is required to deflect the optical axis of the projected beam against the mirror 8, from which it is reflected towards the screen 11.

Although the lens system A shown in FIG. 1 is advantageous in that the depth of the cabinet can be reduced, nevertheless, disadvantages are involved in that the optical path from the lens to the screen is relatively long. This necessitates the use of a lens having a long focal length, and accordingly, a small F-number. Hence, in order to maintain a sufficiently bright image on the screen, it is necessary to employ a lens of large size.

SUMMARY OF THE INVENTION

Accordingly, it is an object of the present invention to provide a projection television receiver having an improved lens system in which a bright image is projected onto the screen without requiring a lens of large size, and in which the cabinet is made compact.

These, as well as the other objects of the invention, are met by a projection television receiver having a lens system in which the optical axis is reflected a plurality of times in a lens barrel so that the angle of the optical axis at the exit of the lens system is nearly parallel to the optical axis at the incident side of the lens system. Preferably, the angle between the optical axis on the exit side is within $180°\pm10°$ with respect to the optical axis at the incident side.

DESCRIPTION OF THE PREFERRED EMBODIMENTS

Figure 5:
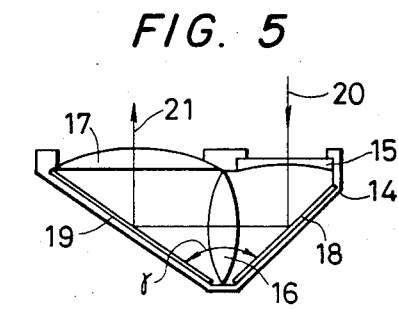
FIGS. 5 and 6 are schematic representations of a lens system employed in a projection television receiver of the present invention.

FIG. 5 shows schematically a lens system constructed in accordance with the present invention. In this lens system, a plano-concave lens 15, a convex lens 16, and a plano-convex lens 17 are mounted in a lens barrel 14. A mirror 18 is disposed between the plano-concave lens 15 and the convex lens 16, while a second mirror 19 is positioned between the convex lens 16 and the plano-convex lens 17. The planes of the mirrors 18 and 19 form an angle of preferably slightly more than 90°.

A ray incident from the convex lens 15 is reflected by the mirror 18 at an angle of about 90° to the convex lens 16. The ray exiting the convex lens 16 is then incident upon the mirror 19, which reflects it at an angle of about 90° to the plano-convex lens 17. Accordingly, the exit optical axis 21 forms an angle of about 180° with respect to the incident optical axis 20. Preferably, the incident and exit optical axes 20 and 21 form small angles $\alpha$ and $\beta$ with respect to vertical lines extending from the incident points of the axes 20 and 21 on the mirrors 18 and 19, respectively. Hence the incident and exit optical axes form and angle of $180°+\alpha+\beta=180°\pm10°$. The reason for deviating from 180° is to facilitate the mounting of the cathode-ray tubes so as to reduce the depth of the cabinet 5.

Figure 9:
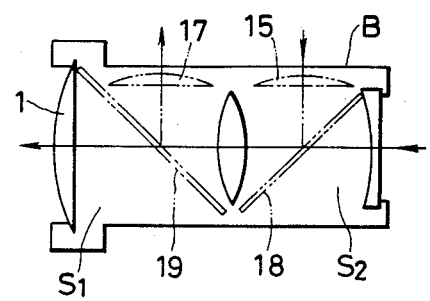
FIG. 9 is an explanatory diagram used for explaining how the lens system employed with the present invention is saving of space.

As indicated by the schematic diagram of FIG. 9, this arrangement of the lens system saves the spaces $S_1$ and $S_2$ which would be wasted if the folded optical path employed by the lens system of the invention were not used.

Figure 6:
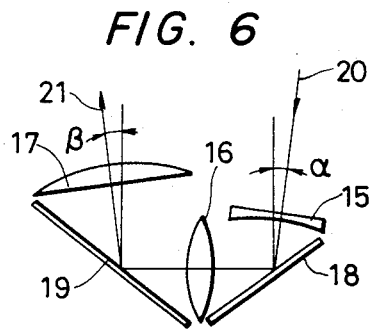
Figure 7:
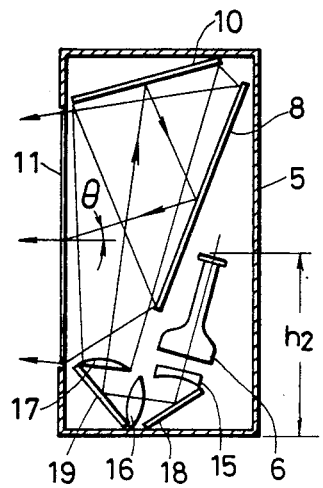
FIGS. 7 and 8 are schematic cross-sectional views showing a projection television receiver of the invention employing a lens system as shown in FIGS. 5 and 6.

FIG. 7 depicts a projection television receiver of the present invention which employs the lens system shown in FIGS. 5 and 6. In FIG. 7, components common with those shown in FIG. 4 are identified by like reference numerals.

Figure 1:
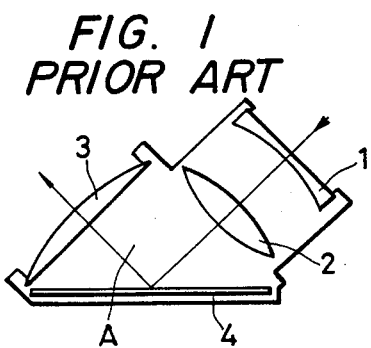
FIGS. 1 and 2 depict schematically conventional lens systems used in projection television receivers.
Figure 2:
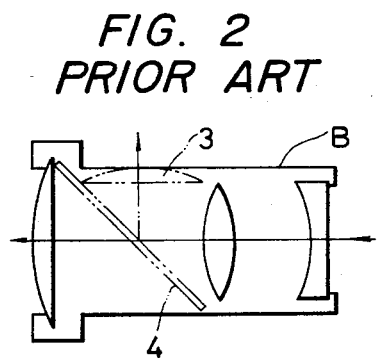
Figure 3:
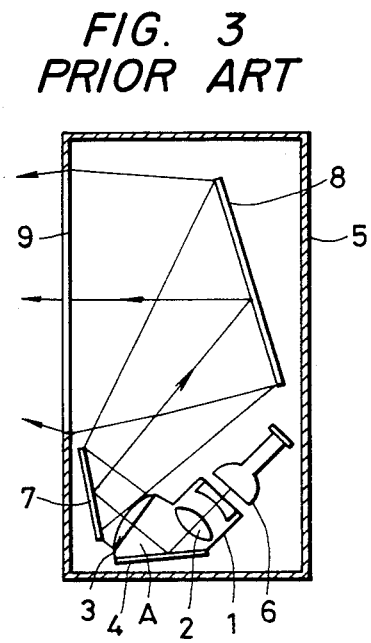
FIGS. 3 and 4 depict in schematic cross-sectional views projection television receivers employing a lens system of the type illustrated in FIG. 1.
Figure 4:
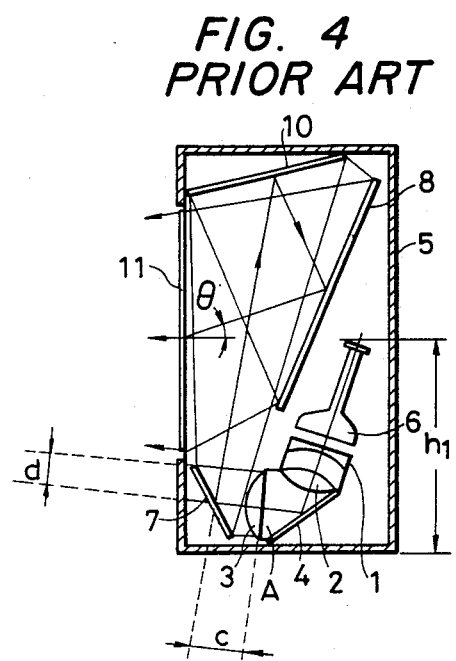

In the projection television receiver of FIG. 7, the mirror 7 employed in the conventional receiver of FIG. 4 is eliminated. The image on the face of the cathode-ray tube 6 is enlarged by the lenses 15, 16 and 17, and reflected at an angle of preferably 180° by the mirrors 18 and 19 to substantially fold the optical axis back on itself. The optical image is incident upon the projection screen 11 at an angle of preferably 10° to 25° with respect to a normal to the screen surface.

Compared with the arrangement of FIG. 4, the optical path from the plano-convex lens 17 on the exit side of the lens system to the screen 11 is reduced by a distance of c+d shown in FIG. 4, primarily due to the omission of the mirror 7.

Representing the optical path length from the plano-convex lens 17 to the screen 11 by L, the focal length of the lens system by f, the effective lens diameter by D, and the magnification by m, the F-number of the lens system can be expressed by:

$$F = f/D = L/D(1+m).$$

As is apparent from the equation above, the F-number of the lens system is proportional to L, assuming m and D are constant. Accordingly, as mentioned above, the length of the optical path in the television receiver according to the invention is reduced, thereby reducing the F-number of the lens system and hence improving the brightness of the image on the screen 11 without increasing the effective lens diameter (lens size).

Because the mirror 7 has been omitted, the height $h_2$ from the base of the cabinet to the rear of the cathode-ray tube 6 may be made less than the corresponding height $h_1$ indicated in FIG. 4. Accordingly, the overall height of the cabinet 5 can be reduced. It is noted that, with the invention, the cathode-ray tube 6 is not mounted entirely vertically with respect to the plane of the base of the cabinet 5, but is tilted so that the depth of the cabinet can be reduced. In other words, the cabinet 5 of the television receiver of the invention is made more compact without decreasing the size of the image or lowering its brightness. For instance, if the television receiver of FIG. 4 has a depth on the order of 600 to 700 mm, for components of the same general size, the inventive receiver of FIG. 7 can have a depth of no more than 450 mm. On the other hand, if the same size cabinet as is employed with the embodiment of FIG. 4 is used, a longer cathode-ray tube 6 may be employed. In such a case, the brightness and focus of the projected image can be further improved.

Figure 8:
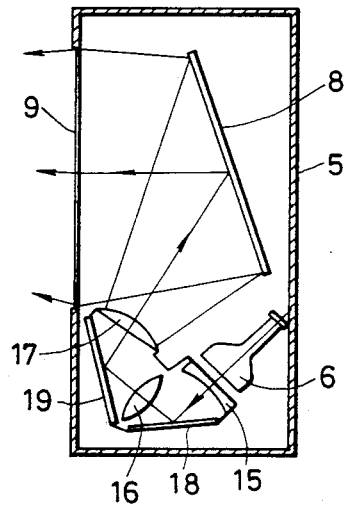

In the embodiment depicted in FIG. 8, the cathode-ray tube 6 and lens system are rotated in position clockwise from their positions depicted in FIG. 7. In this instance, the upper mirror 10 can be eliminated.

Figure 10:
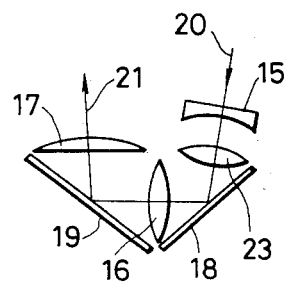
FIGS. 10 and 11 are schematic views showing further embodiments of a lens system which may be employed in a projection television receiver of the invention.
Figure 11:
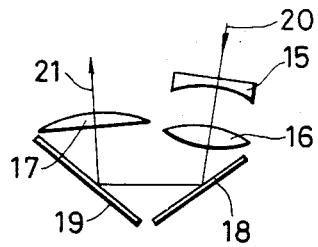

FIGS. 10 and 11 depict schematically another lens system which may be employed with a projection television receiver of the invention. In the lens system of FIG. 10, a plano-concave lens 15 and a convex lens 23 are arranged on the incident side, and in the embodiment of FIG. 11, the lens 16 is moved to the incident side of the mirror 18.

It is to be noted that the lenses employed with the present invention are not limited to those shown in the drawings and described above with reference to particular preferred embodiments. Further, although mirrors are employed in the preferred embodiments described herein, prisms may be used as well.

This completes the description of the preferred embodiments of the present invention. Although preferred embodiments have been described, it is believed that numerous alterations and modifications thereto would be apparent to one of ordinary skill in the art without departing from the spirit and scope of the invention.

I claim:

1. In a projection television receiver including a cabinet, a projecting cathode-ray tube, a display screen and a projecting lens system for projecting an image formed on a face of said cathode-ray tube onto said screen, the improvement wherein said lens system comprises a plano-convex lens and a plano-concave lens having optical axes forming an angle within a range of 170° to 180°, first and second mirrors for reflecting light rays passing through said plano-concave lens along a path parallel to said optical axis of said plano-convex lens, and a convex lens disposed in an optical path between said plano-concave lens and said plano-convex lens.

2. The projection television receiver of claim 1, wherein said convex lens is positioned between said first and second mirrors.

3. The projection television receiver of claim 1, wherein said convex lens is positioned between said plano-concave lens and said first mirror.

4. The television receiver of claim 1, wherein said convex lens is positioned between said first and second mirrors, and further comprising a second convex lens disposed between said plano-concave lens and said first mirror.

5. The projection television receiver of claim 1, wherein said first mirror forms an angle of approximately 45° with the plane of a base of said cabinet, and further comprising third and fourth mirrors, said third mirror being disposed in an upper portion of said cabinet and said fourth mirror being disposed rearwardly of said projection screen, said third mirror reflecting light received from said plano-convex lens to said fourth mirror, and said fourth mirror reflecting said light to said projection screen.

6. The projection television receiver of claim 1, wherein said first mirror is substantially parallel to the plane of a base of said cabinet, and further comprising a third mirror disposed rearwardly of said screen for reflecting light from said plano-convex lens to said screen.

* * * * *